(12) United States Patent
Agami

(10) Patent No.: US 7,201,057 B2
(45) Date of Patent: Apr. 10, 2007

(54) HIGH-TEMPERATURE REDUCED SIZE MANOMETER

(75) Inventor: Mark Agami, Reading, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/954,386

(22) Filed: Sep. 30, 2004

(65) Prior Publication Data

US 2006/0070447 A1   Apr. 6, 2006

(51) Int. Cl.
    *G01L 19/04* (2006.01)
(52) U.S. Cl. .......................... 73/708; 73/706; 73/756; 361/283.1
(58) Field of Classification Search .......... 73/700–756; 361/283.1–283.4
    See application file for complete search history.

(56) References Cited

U.S. PATENT DOCUMENTS

| | | |
|---|---|---|
| 2,416,557 A | 2/1947 | Wiener |
| 2,751,530 A | 6/1956 | Armstrong |
| 2,753,515 A | 7/1956 | Rickner |
| 2,755,419 A | 7/1956 | Hollmann |
| 2,800,796 A | 7/1957 | Westcott et al. |
| 2,907,320 A | 10/1959 | Weese et al. |
| 2,999,386 A | 9/1961 | Wolfe |
| 3,000,215 A | 9/1961 | Atanasoff et al. |
| 3,113,459 A | 12/1963 | Slater |
| 3,153,847 A | 10/1964 | Lindberg |
| 3,243,998 A | 4/1966 | Vosteen |
| 3,318,153 A | 5/1967 | Lode |
| 3,354,721 A | 11/1967 | Fiske |
| 3,371,537 A | 3/1968 | Kiene |
| 3,460,310 A | 8/1969 | Adcock et al. |
| 3,619,742 A | 11/1971 | Rud, Jr. |
| 3,620,083 A | 11/1971 | Dimeff et al. |
| 3,675,072 A | 7/1972 | Hahn et al. |
| 3,858,097 A | 12/1974 | Polye |
| 3,952,234 A | 4/1976 | Birchall |
| 3,968,695 A | 7/1976 | Weiss et al. |
| 4,008,619 A | 2/1977 | Alcaide et al. |

(Continued)

FOREIGN PATENT DOCUMENTS

DE    1 282 302    11/1968

(Continued)

OTHER PUBLICATIONS

Bal Seal Engineering Company, Inc., Santa Ana, California, BAL SAL Canted Coil Spring Gaskets, pp. 3.2-2 and 3.2-14.

(Continued)

*Primary Examiner*—Edward Lefkowitz
*Assistant Examiner*—Jermaine Jenkins
(74) *Attorney, Agent, or Firm*—Wilmer Cutler Pickering Hale and Dorr LLP

(57) ABSTRACT

A pressure-sensing device and method for making and using such device having a temperature differential between two portions of the device is disclosed. A solid-state heat pump, such as a thermo-electric cooler (TEC), is used to pump heat from a cold portion to a hot portion of the device. A pressure sensor sensing the pressure of a hot fluid is disposed in the hot portion of the device, and sensor electronics are disposed in the cold portion of the device.

29 Claims, 12 Drawing Sheets

U.S. PATENT DOCUMENTS

| | | |
|---|---|---|
| 4,011,901 A | 3/1977 | Flemings et al. |
| 4,020,674 A | 5/1977 | Fechter et al. |
| 4,084,438 A | 4/1978 | Lee et al. |
| 4,084,439 A | 4/1978 | Teter et al. |
| 4,120,206 A | 10/1978 | Rud, Jr. |
| 4,136,603 A | 1/1979 | Doyle, Jr. |
| 4,141,252 A | 2/1979 | Lodge |
| 4,168,517 A | 9/1979 | Lee |
| 4,168,518 A | 9/1979 | Lee |
| 4,176,557 A | 12/1979 | Johnston |
| 4,178,621 A | 12/1979 | Simonelic et al. |
| 4,229,776 A | 10/1980 | Antikainen et al. |
| 4,302,063 A | 11/1981 | Rudy |
| 4,322,775 A | 3/1982 | Delatorre |
| 4,334,725 A | 6/1982 | Teshima et al. |
| 4,357,834 A | 11/1982 | Kimura |
| 4,358,814 A | 11/1982 | Lee et al. |
| 4,389,895 A | 6/1983 | Rud, Jr. |
| 4,422,125 A | 12/1983 | Antonazzi et al. |
| 4,422,335 A | 12/1983 | Ohnesorge et al. |
| 4,424,713 A | 1/1984 | Kroninger, Jr. et al. |
| 4,425,799 A | 1/1984 | Park |
| 4,426,673 A | 1/1984 | Bell et al. |
| 4,433,580 A | 2/1984 | Tward |
| 4,434,203 A | 2/1984 | Briefer |
| 4,458,537 A | 7/1984 | Bell et al. |
| 4,464,725 A | 8/1984 | Briefer |
| 4,495,820 A | 1/1985 | Shimada et al. |
| 4,499,773 A | 2/1985 | Crampton et al. |
| 4,542,436 A | 9/1985 | Carusillo |
| 4,562,742 A | 1/1986 | Bell |
| 4,567,773 A | 2/1986 | Cooper et al. |
| 4,572,204 A | 2/1986 | Stephens |
| 4,587,851 A | 5/1986 | Mortberg |
| 4,598,381 A | 7/1986 | Cucci |
| 4,603,371 A | 7/1986 | Frick |
| 4,628,403 A | 12/1986 | Kuisma |
| 4,670,733 A | 6/1987 | Bell |
| 4,679,643 A | 7/1987 | Bove |
| 4,691,574 A | 9/1987 | Delatorre |
| 4,714,464 A | 12/1987 | Newton |
| 4,733,875 A | 3/1988 | Azuma et al. |
| 4,735,090 A | 4/1988 | Jeffrey et al. |
| 4,735,098 A | 4/1988 | Kavli et al. |
| 4,738,276 A | 4/1988 | Adams |
| 4,748,861 A | 6/1988 | Matsumoto et al. |
| 4,765,188 A | 8/1988 | Krechmery et al. |
| 4,769,738 A | 9/1988 | Nakamura et al. |
| 4,774,626 A | 9/1988 | Charboneau et al. |
| 4,785,669 A | 11/1988 | Benson et al. |
| 4,807,477 A | 2/1989 | Myers et al. |
| 4,815,324 A | 3/1989 | Tada et al. |
| 4,823,603 A | 4/1989 | Ferran et al. |
| 4,831,492 A | 5/1989 | Kuisma |
| 4,850,227 A | 7/1989 | Luettgen et al. |
| 4,851,015 A | 7/1989 | Wagner et al. |
| 4,875,368 A | 10/1989 | Delatorre |
| 4,898,035 A | 2/1990 | Yajima et al. |
| 4,920,805 A | 5/1990 | Yajima et al. |
| 4,935,841 A | 6/1990 | Jonsson et al. |
| 4,943,032 A * | 7/1990 | Zdeblick ............... 251/11 |
| 4,944,187 A | 7/1990 | Frick et al. |
| 4,977,480 A | 12/1990 | Nishihara |
| 5,001,595 A | 3/1991 | Dittrich et al. |
| 5,005,421 A | 4/1991 | Hegner et al. |
| 5,020,377 A | 6/1991 | Park |
| 5,050,034 A | 9/1991 | Hegner et al. |
| 5,134,887 A | 8/1992 | Bell |
| 5,150,275 A | 9/1992 | Lee et al. |
| 5,155,653 A | 10/1992 | Kremidas |
| 5,165,281 A | 11/1992 | Bell |
| 5,186,055 A | 2/1993 | Kovacich et al. |
| 5,189,591 A | 2/1993 | Bernot |
| 5,249,469 A | 10/1993 | Jonsson et al. |
| 5,257,542 A | 11/1993 | Voss |
| 5,271,277 A | 12/1993 | Pandorf |
| 5,275,055 A | 1/1994 | Zook et al. |
| 5,279,163 A | 1/1994 | D'Antonio et al. |
| 5,291,534 A | 3/1994 | Sakurai et al. |
| 5,311,140 A | 5/1994 | Permuy |
| 5,315,877 A | 5/1994 | Park et al. |
| 5,333,637 A | 8/1994 | Gravel |
| 5,343,755 A | 9/1994 | Huss |
| 5,348,568 A | 9/1994 | Oda et al. |
| 5,349,492 A | 9/1994 | Kimura et al. |
| 5,349,865 A | 9/1994 | Kavli et al. |
| 5,351,548 A | 10/1994 | Briggs et al. |
| 5,351,938 A | 10/1994 | Hegner et al. |
| 5,369,228 A | 11/1994 | Faust |
| 5,400,489 A | 3/1995 | Hegner et al. |
| 5,442,962 A | 8/1995 | Lee |
| 5,443,410 A | 8/1995 | Ko |
| 5,485,345 A | 1/1996 | Lukasiewicz et al. |
| 5,497,620 A | 3/1996 | Stobbe |
| 5,499,158 A | 3/1996 | Bishop et al. |
| 5,499,533 A | 3/1996 | Miller et al. |
| 5,507,080 A | 4/1996 | Hayashi et al. |
| 5,539,611 A | 7/1996 | Hegner et al. |
| 5,541,561 A | 7/1996 | Grunert et al. |
| 5,542,300 A | 8/1996 | Lee |
| 5,544,490 A | 8/1996 | Manini et al. |
| 5,561,247 A | 10/1996 | Mutoh et al. |
| 5,571,970 A | 11/1996 | Mutoh et al. |
| 5,603,684 A | 2/1997 | Wetmore et al. |
| 5,604,315 A | 2/1997 | Briefer et al. |
| 5,625,152 A | 4/1997 | Pandorf et al. |
| 5,719,740 A | 2/1998 | Hayashi et al. |
| 5,756,899 A | 5/1998 | Ugai et al. |
| 5,800,235 A | 9/1998 | Ragsdale |
| 5,808,206 A | 9/1998 | Pandorf et al. |
| 5,811,685 A | 9/1998 | Grudzien, Jr. |
| 5,836,063 A | 11/1998 | Hegner et al. |
| 5,885,682 A | 3/1999 | Tanimoto et al. |
| 5,911,162 A | 6/1999 | Denner |
| 5,916,479 A | 6/1999 | Schiabel et al. |
| 5,920,015 A | 7/1999 | Hallberg et al. |
| 5,925,824 A | 7/1999 | Soma et al. |
| 5,932,332 A | 8/1999 | Pandorf et al. |
| 5,939,639 A | 8/1999 | Lethbridge |
| 5,948,169 A | 9/1999 | Wu |
| 5,965,821 A | 10/1999 | Grudzien |
| 6,029,524 A | 2/2000 | Klauder et al. |
| 6,029,525 A | 2/2000 | Grudzien |
| 6,105,436 A | 8/2000 | Lischer et al. |
| 6,105,437 A | 8/2000 | Klug et al. |
| 6,112,597 A | 9/2000 | Tschope |
| 6,119,524 A | 9/2000 | Kobold |
| 6,148,674 A | 11/2000 | Park et al. |
| 6,205,861 B1 | 3/2001 | Lee |
| 6,209,398 B1 | 4/2001 | Fowler et al. |
| 6,315,734 B1 | 11/2001 | Nunome |
| 6,340,929 B1 | 1/2002 | Katou et al. |
| 6,423,949 B1 | 7/2002 | Chen et al. |
| 6,439,056 B1 | 8/2002 | Jonsson |
| 6,443,015 B1 | 9/2002 | Poulin et al. |
| 6,451,159 B1 | 9/2002 | Lombardi et al. |
| 6,516,671 B2 | 2/2003 | Romo et al. |
| 6,528,008 B1 | 3/2003 | Bjoerkman |
| 6,568,274 B1 | 5/2003 | Lucas et al. |
| 6,578,427 B1 | 6/2003 | Hegner |
| 6,588,280 B1 * | 7/2003 | Quigley et al. ............... 73/708 |
| 6,591,687 B1 | 7/2003 | Bjoerkman et al. |
| 6,612,176 B2 | 9/2003 | Poulin et al. |
| 6,735,845 B2 | 5/2004 | Jonsson |

| | | | |
|---|---|---|---|
| 6,892,745 B2 * | 5/2005 | Benson .......................... 137/1 |
| 6,901,808 B1 | 6/2005 | Sharpless et al. |
| 6,964,501 B2 * | 11/2005 | Ryan ........................... 362/294 |
| 7,000,479 B1 * | 2/2006 | Poulin et al. ................. 73/708 |
| 7,124,640 B1 * | 10/2006 | Miller et al. .................. 73/708 |
| 2002/0026835 A1 | 3/2002 | Jacob et al. |
| 2003/0003618 A1 * | 1/2003 | Fujii et al. ..................... 438/45 |
| 2003/0167852 A1 | 9/2003 | Traverso |
| 2004/0002655 A1 * | 1/2004 | Bolorforosh et al. ....... 600/459 |
| 2004/0076215 A1 * | 4/2004 | Baumbach ................... 374/29 |
| 2005/0075573 A1 * | 4/2005 | Park et al. ................... 600/459 |
| 2005/0134167 A1 * | 6/2005 | Deguchi et al. ............ 313/491 |

FOREIGN PATENT DOCUMENTS

| | | |
|---|---|---|
| DE | 40 11 901 A1 | 10/1991 |
| DE | 41 11 118 A1 | 10/1992 |
| DE | 4 136 995 A1 | 5/1993 |
| DE | 42 07 951-A-1 | 9/1993 |
| EP | 275 844 | 7/1988 |
| EP | 0 473 109 A2 | 3/1992 |
| EP | 0 490 807 A2 | 6/1992 |
| EP | 549 229 A2 | 6/1993 |
| FR | 895938 | 2/1945 |
| GB | 1 497 212 A | 1/1978 |
| GB | 2 044 523 | 10/1980 |
| GB | 2 162 837 | 2/1986 |
| GB | 2 188 155 | 9/1987 |
| JP | 56-162026 A2 | 12/1981 |
| JP | 5-172675 A2 | 7/1993 |
| SU | 1362971 | 7/1986 |
| WO | WO-99/01731 | 1/1990 |
| WO | WO-95/06236 | 3/1995 |
| WO | WO-95/28623 | 10/1995 |
| WO | WO-95/28624 A1 | 10/1995 |
| WO | WO-98/28624 | 7/1998 |
| WO | WO-98/37392 | 8/1998 |
| WO | WO-98/37393 | 8/1998 |
| WO | WO-98/59228 | 12/1998 |
| WO | WO-99/32866 | 7/1999 |
| WO | WO-99/40405 | 8/1999 |
| WO | WO-00/43745 | 7/2000 |
| WO | WO-01/18516 A1 | 3/2001 |
| WO | WO-01/25740 | 4/2001 |
| WO | WO-02/31458 A2 | 4/2002 |
| WO | WO-02/054034 A1 | 7/2002 |
| WO | WO-03/056289 A1 | 7/2003 |
| WO | WO-03/078952 A2 | 9/2003 |
| WO | WO-03/089891 A1 | 10/2003 |

OTHER PUBLICATIONS

Baratron® Absolute Pressure Transmitters 400 Series, © 1996 MKS Instruments, Inc., Andover, MA.

Baratron® General Purpose Absolute Pressure Transducers, 1993 MKS Instruments, Inc.

Beynon, J.D.E., et al., "A Simple Micromanometer," 1964, J. Sci. Instruments, vol. 41 (2), pp. 111-112.

Cook, D.B. et al., "A Simple Diaphragm Micromanometer," 1953, J. Scientific Instruments, vol. 30, pp. 238-239.

Derwent's Abstract No. 88-197466/28, week 8828, Abstract of SU, 132971, Dec. 30, 1987.

Derwent's abstract No. 91-199892/27, week 9127, Abstract of SU, 1605145 (Mikhailov, P.G.), Nov. 7, 1990 (Accessesion No. 8695871).

Derwent's abstract No. 91-199893/27, week 9127, Abstract of SU, 1605146 (Pukhov, V.N.) Nov. 7, 1990.

English Translation from Russian of SU 1362971, Semenov et al., Method for the Evacuation of Absolute-Pressure Sensors and Device for the Carrying Out of the Method, Dec. 1987.

Instrument Specialities, Product Design & Shielding Selection Guide, Fabricated UltraFlex Gaskets, p. 108.

Patent Abstracts of Japan, Abstract of JP-59-56970, Apr. 2, 1984.

Teknit, EMI Shield Products, "Custom strips," p. A-3.

\* cited by examiner

HIGH-TEMPERATURE REDUCED SIZE MANOMETER

TECHNICAL FIELD

The present application relates to pressure sensing devices. More particularly, the present application relates to maintaining a temperature differential between two portions of a pressure sensing device.

BACKGROUND

FIG. 1 illustrates a sectional view of a prior art heated capacitive pressure sensing device 100. Device 100 includes several major components such as an external metallic shell 110, an internal heater shell 120, a heater 130, a capacitive pressure sensor 140, an inlet tube 144, and electronics assemblies 170. In operation inlet tube 144 is connected to an external source of gas (not shown), and transducer 100 generates an output signal indicative of the pressure of the gas in inlet tube 144. The term "gas" is used herein to refer to any fluid.

For convenience of illustration, many mechanical details of transducer 100, such as the construction of sensor 140 and the mounting of sensor 140 and electronics assemblies 170, have been omitted from FIG. 1. However, heated capacitive pressure transducers such as transducer 100 are well known and are described for example in U.S. Pat. No. 5,625,152 (Pandorf); U.S. Pat. No. 5,911,162 (Denner); and U.S. Pat. No. 6,029,525 (Grudzien).

Pressure sensing device 100 is typically used in integrated circuit fabrication facilities to measure a pressure such as the pressure within a chemical vapor deposition chamber, or the pressure of a gas that is being supplied in controlled volumes to such a deposition chamber. The gasses in such facilities are typically carefully maintained at a particular temperature such as two hundred degrees Celsius (200° C.). Heaters are included in pressure sensing device 100 to heat the surfaces that contact the gas, such as the internal surfaces of sensor 140 and inlet tube 144, to the same temperature as the gas. This avoids condensation of the gas within pressure sensing device 100 and also reduces distortions in the pressure measurement provided by pressure sensing device 100.

External metallic shell 110 includes a lower sensor enclosure 112, an upper electronics enclosure 114, and a joiner 116 that holds enclosures 112, 114 together. Heater shell 120 is disposed within the lower enclosure 112 and includes a lower enclosure or can 122 and a cover 124. Pressure sensor 140 is disposed within heater shell 120. A temperature sensor (e.g., a thermistor) 190 is fixed to an internal surface of heater shell 120. Heater 130 is disposed on the external surface of heater shell 120 and includes a barrel heater 132 and an end heater 134. Barrel heater 132 is wrapped around the external cylindrical sidewall of can 122 and end heater 134 is disposed on the bottom of can 122. Barrel heater 132 and end heater 134 are electrically connected via wires 136 so the two heaters 132, 134 may be simultaneously controlled via a single electrical signal. Electronics assemblies 170 are disposed within the upper electronics enclosure 114.

Since the temperature of the gas 111 (e.g., 200° C.) is often too high for reliably operating electronics assemblies 170, the electronics assemblies 170 are located in an area that is remote from any of the surfaces within pressure sensing device 100 that will actually contact the gas. This allows the electronics assemblies 170 to operate at one temperature (e.g., 70° C.) while the sensor 140 is simultaneously operated at a higher temperature (e.g., 200° C.). Also, since human operators sometimes touch the external surfaces of transducer 100, to prevent injuries it is generally desirable to insure that the external surfaces remain below about 60° C. Thus, while it is in operation, transducer 100 may be characterized by three different operating temperatures. A first temperature (e.g., 200° C.), to which the surfaces that contact the gas are heated; a second temperature (e.g., 70° C.) at which the electronics assemblies 170 operate; and a third temperature (e.g., 60° C.) which the external shell 110 does not exceed.

The above noted U.S. Pat. No. 5,625,152 (Pandorf) discloses prior art transducers that use various combinations of heating, insulating, and ventilating, that enable the transducers to simultaneously operate at the three desired temperature ranges. Although those transducers have been generally successful, they are often bulkier than is desirable. Accordingly, there remains a need for improved thermal control in pressure sensing devices.

SUMMARY

One or more aspects of the present invention provide a reduced size high-temperature pressure-sensing device including a solid state heat pump that transfers heat from a cold electronics portion of the device housing to a hot sensor portion of the device housing.

Accordingly, one embodiment is directed to a pressure-sensing device, including a housing; sensor electronics disposed within a first portion of the housing; a pressure sensor disposed within a second portion of the housing; and a solid-state heat pump (SSHP) disposed between the first and second portions of the housing, the SSHP constructed and arranged to transfer heat from a first face of the SSHP, proximal to the first portion of the housing to a second face of the SSHP, proximal to the second portion of the housing. The SSHP may be in the form of a thermoelectric cooler (TEC), and the device may further comprise a thermal channel that distributes and channels heat within the device.

Another embodiment is directed to a method for maintaining a temperature differential between a pressure sensor and sensor electronics disposed within a housing of a pressure-sensing device, the method comprising transferring heat from a first portion of the housing including the sensor electronics to a second portion of the housing including the pressure sensor using a SSHP.

Yet another embodiment is directed to a pressure-sensing device, including a housing; a thermal barrier substantially dividing the housing into a first chamber and a second chamber; sensor electronics disposed within the first chamber; a capacitive pressure sensor disposed within the second chamber; and a thermoelectric cooler constructed and arranged to transfer heat from a first face of the TEC, proximal to the first chamber of the housing to a second face of the TEC, proximal to the second portion of the housing.

Still other objects and advantages of the present invention will become apparent to those skilled in the art from the following detailed description wherein several embodiments are shown and described, by way of illustration of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION

Generally, pressure-sensing devices constructed according to the invention include a solid state heat pump (SSHP), which is used to pump heat from a cold portion of the device, containing sensor electronics, to a hot portion of the device, containing a pressure sensor, such as a capacitive pressure sensor. By maintaining a controlled flow of heat from the cold to the hot portions of the device, a controlled thermal differential is maintained between the cold and the hot portions of the device. In a preferred embodiment, the SSHP is a thermoelectric cooler (TEC) having a cold side facing the sensor electronics and a hot side facing the capacitive pressure sensor. The terms "hot" and "cold" are used herein in a relative sense rather than an absolute sense.

The principle of operation of a TEC is generally known as the "Peltier effect". Briefly, the Peltier effect relates to the production of a heat flow when an electrical current exists at a junction of two dissimilar metals. A TEC may be provided in a substantially planar form (or a plate) that moves heat from a cold face of the plate to a hot face of the plate. Packaged TECs are available in a number of forms and sizes. For example, Ferrotec (Nashua, N.H.) sells a standard TEC, part number 9501/127/030B, that is a 1.2 inch square that is only 5/32 of an inch thick.

Figure 1:
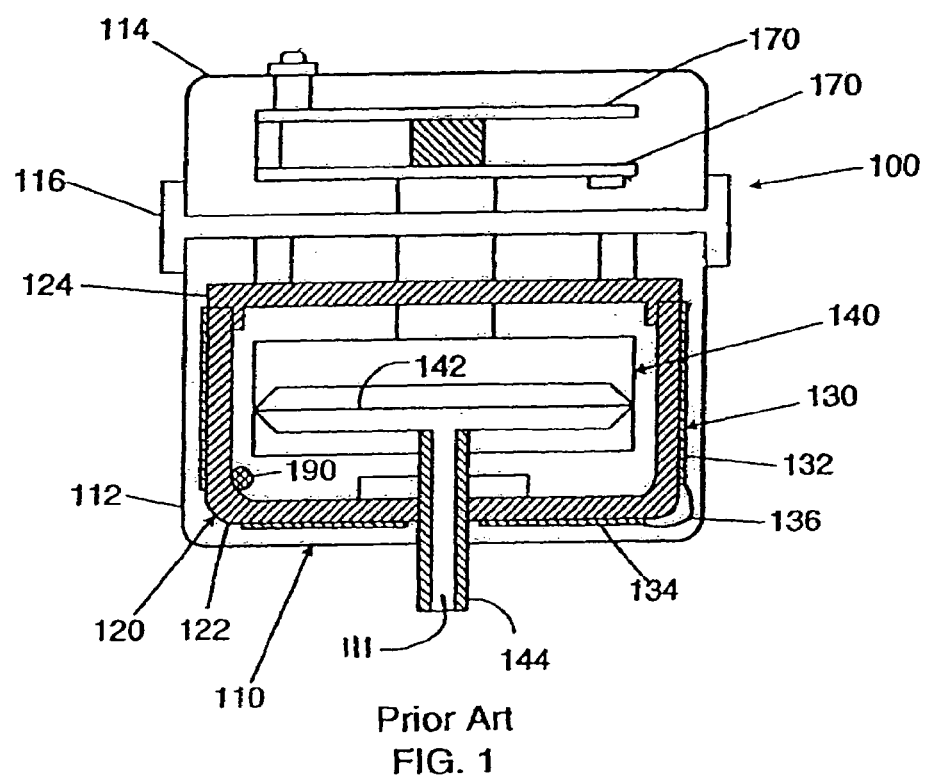
FIG. 1 illustrates a prior art capacitive pressure sensing device.
Figure 2:
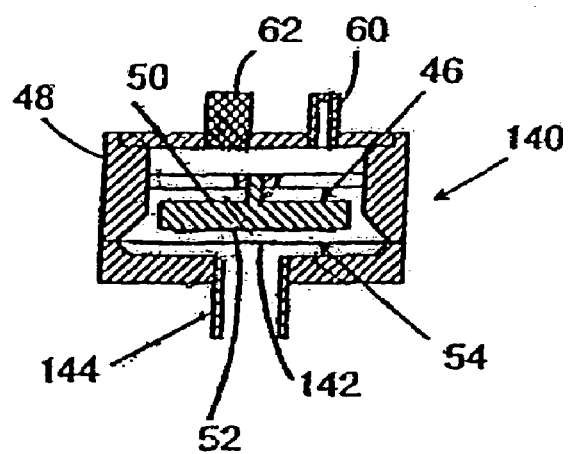
FIG. 2 illustrates a prior art capacitive pressure sensor.

The design and operation of capacitive pressure sensors is generally known to those of skill in the art, but an exemplary sensor such as can be used in the present context is described below. Referring to FIG. 2, sensor 140 includes a flexible metallic diaphragm 142 and a pressure inlet tube 144. Tube 144 extends from an area proximal to the diaphragm 142 through the heater shell 120, and through the lower sensor enclosure 112 (not shown in FIG. 2). The lower, or external, end of tube 144 is generally coupled to a source of gas or other fluid (not shown). The pressure of the gas in the source is communicated via tube 144 to the lower surface of diaphragm 142 and the diaphragm 142 flexes up or down in response to changes in pressure within tube 144. Diaphragm 142 and a reference conductive plate of sensor 140 form a capacitor, and the capacitance of that capacitor varies in accordance with movement or flexion of the diaphragm. Accordingly, that capacitance is indicative of the pressure within tube 144. Electronics assemblies 170 generate an output signal representative of the capacitance of sensor 140, which is also representative of the pressure within tube 144 (see FIG. 1). Electronics assemblies 170 make that output signal available to the environment external to pressure sensing device 100.

Capacitive pressure sensors of the type shown in FIG. 2 are discussed in greater detail in U.S. Pat. No. 6,029,525 (Grudzien). The sensor 140 shown in FIG. 2 also includes an electrode 46. Electrode 46 and diaphragm 142 are mounted within a housing 48. Electrode 46 includes a ceramic block 50 and a conductive plate 52. The ceramic block 50 is rigidly mounted to the housing 48 so that a bottom face of block 50 is generally parallel to, and spaced apart from, the diaphragm. The bottom face of block 50 is usually planar and circular. The conductive plate 52 is deposited onto the bottom face of block 50 and is also generally parallel to, and spaced apart from, the diaphragm. Conductive plate 52 and diaphragm 142 form two plates of a variable capacitor 54. The capacitance of capacitor 54 is determined in part by the gap, or spacing, between the diaphragm 142 and the conductive plate 52. Since the diaphragm flexes up and down (thereby changing the spacing between diaphragm 142 and conductive plate 52) in response to pressure changes in tube 144, the capacitance of capacitor 54 is indicative of the pressure within tube 144.

FIG. 2 shows only one of the many known ways of configuring a capacitive pressure sensor 140. However, capacitive pressure sensors 140 generally include one or more conductors that are held in spaced relation to a flexible, conductive, diaphragm. The diaphragm and the conductors form plates of one or more variable capacitors and the capacitance of those capacitors varies according to a function of the pressure in tube 144.

Capacitive pressure sensors often include additional features such as a tube 60 and a getter 62 as shown in FIG. 2. When sensor 140 is being constructed, tube 60 is initially open and is used to establish a reference pressure (e.g., vacuum) in the portion of pressure sensor housing 48 above diaphragm 142. Once the desired reference pressure is established (e.g., by attaching a vacuum pump to tube 60), the upper portion of tube 60 is closed, or "pinched off", so as to maintain the desired reference pressure inside the upper portion of housing 48. Getter 62 is often included to absorb gas molecules that get into the upper portion of housing 48 after tube 60 has been pinched off (e.g., via outgasing of block 50).

Figure 3:
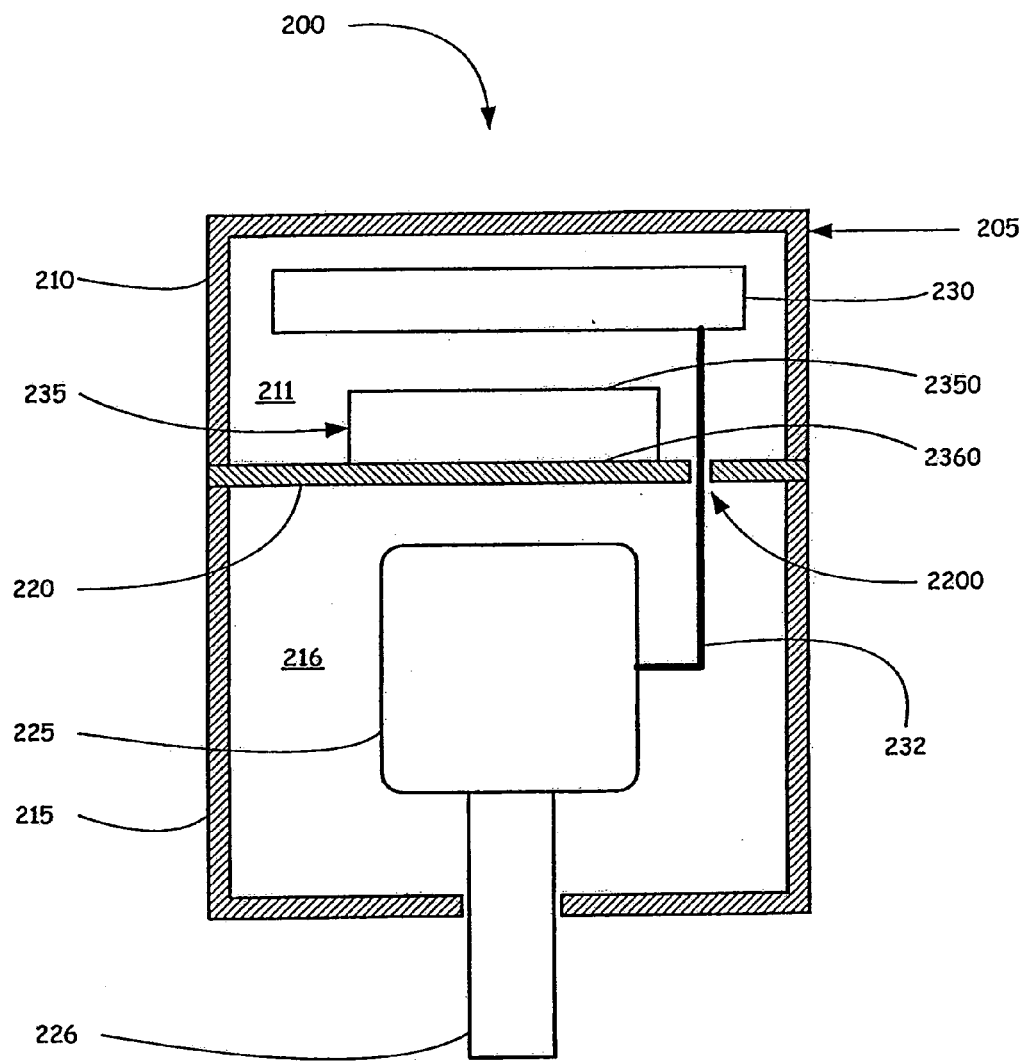
FIG. 3 illustrates an embodiment of a pressure-sensing device constructed according to the invention.

FIG. 3 illustrates an exemplary pressure-sensing device 200 constructed according to one embodiment of the present invention. Pressure-sensing device 200 comprises a housing 205, which defines an interior volume of the pressure-sensing device and houses the internal components of the device. Housing 205 includes an upper housing (or portion) 210 and a lower housing (or portion) 215. Upper housing 210 is normally constructed of a poor conductor of heat, such as stainless steel, and lower housing 215 is normally constructed of a highly thermally conductive metal, such as aluminum.

Device 200 also includes a thermal channel 220, which is disposed between, and in contact with, the upper housing 210 and the lower housing 215. The thermal channel 220 substantially divides the interior space of housing 205 into two portions, a first (upper) portion 211, substantially surrounded by an upper portion 210 of housing 205, and a second (lower) portion 216, substantially surrounded by a lower portion 215 of housing 205. The terms "upper" and "lower," and similar terms, are made with reference to the figures, e.g. FIG. 3, and do not imply an absolute orientation of a device 200. Those skilled in the art would appreciate alternate configurations and orientations of the devices and components being described. Upper portion 211 includes the portion of housing 205 above thermal channel 220. Lower portion 215 includes the portion of housing 205 below thermal channel 220.

Pressure-sensing device 200 also includes a pressure sensor 225 disposed within the lower portion 215 of housing 205. Pressure sensor 225 may be a capacitive pressure sensor constructed, for example, in the fashion of the sensor shown in FIG. 2. More generally, sensor 225 may include an electromechanical capacitive transducer, which converts a pressure differential between the fluid pressure and a reference pressure (or a pressure differential between two fluids) into a deflection of a membrane that affects a sensing capacitor's capacitance. Pressure sensor 225 is coupled by a pressure inlet tube 226 to a fluid system (not shown) whose pressure is to be measured. The fluid may be at a high temperature, e.g. 200° C. or higher.

The pressure sensor 225 is controlled and/or monitored by sensor electronics 230, which are disposed on a circuit board in the upper portion 210 of housing 205. Electrical conductor 232 connects the pressure sensor 225 and the sensor electronics 230. The conductor 232 can be an insulated electrical bus that provides power and data connections between the pressure sensor 225 and the sensor electronics 230.

A solid state heat pump (SSHP) 235 is disposed within the upper portion 210 of housing 205. A hot side 2360 of SSHP 235 is coupled to the thermal channel 220, and a cold side 2350 of SSHP 235 is proximal to the sensor electronics 230. SSHP 235 is an active electrically-powered heat pump, and may be implemented, for example, as a thermal electric cooler (TEC). The operation of SSHP 235 will be described in more detail below, but, generally, the SSHP 235 moves heat from its cold side 2350 to its hot side 2360.

In operation of pressure-sensing device 200, the sensor electronics 230 operate at a first temperature (e.g., 70° C.) and the pressure sensor 225 operates at a second, higher, temperature (e.g., 200° C.). Heaters are generally not needed to maintain the sensor electronics 230 at the first temperature. Rather, the heat generated by operation of the sensor electronics 230 is more than sufficient to heat the electronics to the first temperature. To prevent the sensor electronics 230 from exceeding the first temperature (e.g., exceeding 70° C.), some of the heat generated by the sensor electronics 230 must generally be transferred away from the upper portion 210 of the housing 205. In the prior art, the excess heat generated by sensor electronics has been generally regarded as "waste heat". Various strategies have been used for transferring this "waste heat" to the ambient environment in an effort to maintain the sensor electronics at a desired temperature.

Unlike the sensor electronics (which generally require removal of heat to maintain the electronics at a desired temperature), heat must generally be applied to maintain the pressure sensor at a desired temperature (e.g., 200° C.). In pressure-sensing device 200, SSHP 235 advantageously uses some of the heat generated by sensor electronics 230 to heat the pressure sensor. In operation, the lower portion 215 of housing 205 is hotter than the upper portion 210. Since heat generally flows from hot places to cold places, the heat generated by sensor electronics 230 (within the cooler portion 210 of housing 205) would not normally be available to heat the pressure sensor 225 (within the hotter portion 215 of housing 205). However, SSHP 235 is capable of reversing the normal flow of heat and of pumping heat from a cold place to a hot place.

As will be discussed in more detail below, pressure-sensing devices constructed according to the invention can include heaters (e.g., such as the heater 130 shown in FIG. 1) for heating the pressure sensor. However, in addition to such heaters, pressure-sensing devices constructed according to the invention also include a SSHP. The SSHP, as well as other heaters if included, apply heat to the second portion 215 of the housing and this heat is used to provide a thermally stable environment for pressure sensor 225.

It is generally desirable for the pressure sensor 225 to operate in a thermally stable environment that is free from thermal gradients. From the perspective of pressure sensor 225, the SSHP 235 may be viewed as a heat source (or "hot spot") that transfers heat from the sensor electronics 230 towards the top of sensor 225. Ideally, the pressure sensor 225 should not be surrounded by hot and cold spots, and should instead be surrounded by a thermal shell, every portion of which is at the same, uniform, temperature. In operation, thermal channel 220 advantageously distributes heat received from SSHP 230 to the lower portion 215 of housing 205 so that thermal channel 220 and the lower portion 215 of housing 204 form a uniformly heated thermal shell that surrounds pressure sensor 225.

The thermal channel 220 includes a thermally-conducting layer having a peripheral portion that is thermally-coupled to the walls of housing 205. The thermal channel 220 transports heat received from SSHP 235 by conduction from a central portion of the channel 220 to a peripheral portion of the channel 220. Preferably, the thermal channel 220 includes a metal plate that is coupled to the housing 205 by a weld joint, metal spring, or other thermally-conducting coupler. Examples of the construction of thermal channel 220 will be provided below. Thermal channel 220 and the lower portion 215 of housing 205 in effect provide a uniform thermal shell that surrounds sensor 225. Since any heat that is localized to a portion of the shell (e.g., thermal channel 220, housing 205) is quickly conducted uniformly around the shell, the shell tends to reduce any thermal gradients from the environment of sensor 225.

The SSHP 235 is preferably coupled to thermal channel 220 in a way that allows the SSHP 235 and the thermal channel 220 to collectively maintain a selected temperature differential between first (cold) portion 210 and second (hot) portion 215 of housing 205. In some embodiments, this temperature differential is 100° C. or more. Mechanical or thermal couplers (e.g., screws or adhesives) may be used to establish contact between SSHP 235 and thermal channel 220.

The operation of pressure-sensing device 200 may be analogized to a system that includes a freezer and an oven, the freezer being used to cool ice cream and the oven being used to roast a turkey. In a conventional version of such a system, energy is applied to heating elements within the oven in order to generate sufficient heat for cooking the turkey. In such a conventional system, heat generated by operation of the freezer is regarded as "waste heat" and is conducted to the ambient environment. However, it is possible to transfer the "waste heat" generated by the freezer to the oven and thereby put the "waste heat" to a useful purpose. Device 200 uses similar principles and advantageously uses what would otherwise be waste heat generated by the sensor electronics 230 to heat the pressure sensor 225. SSHP 235 provides a mechanism for transferring the waste heat (against the normal direction of heat flow) from the cooler environment of the sensor electronics to the hotter environment of the pressure sensor 225. Thermal channel 220 and the lower portion 215 of housing 205 ensure that heat applied by the SSHP, and other heaters if included, is distributed uniformly around the pressure sensor enabling the pressure sensor to be disposed within a thermally stable environment in which thermal gradients are eliminated or minimized.

Figure 3A:
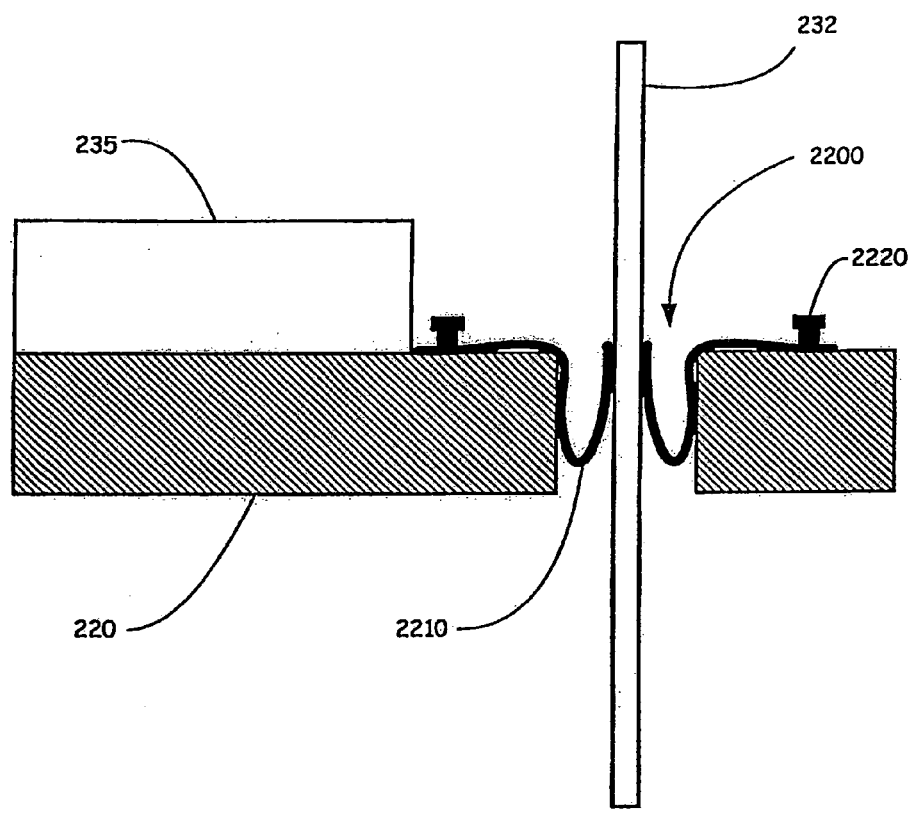
FIG. 3A illustrates an opening for electrical connections between upper and lower portions of a housing shown in FIG. 3.

To facilitate electrical connections between pressure sensor 225 and sensor electronics 230, an opening 2200 is provided in the thermal channel 220 for passage of electrical conductor 232. As shown, one end of conductor 232 is connected to sensor 225 and the other end of conductor 232 is connected to sensor electronics 230. Since electronics 230 operates at a substantially lower temperature than that of sensor 225, it is desirable to thermally couple conductor 232 to thermal channel 220 to prevent conductor 232 from conducting heat from sensor 225 to electronics 230 and thereby acting as a heat sink to sensor 225. As shown in FIG. 3A, the opening 2200 may be fortified against heat leakage across the thermal channel 220 by providing a flexible thermally-conducting coupler, such as a metallic spring or a leaf spring 2210 around the opening and substantially contacting both the electrical conductor 232 and the thermal channel 220. The flexible coupler 2210 is shown attached to thermal channel 220 by pins 2220. Flexible coupler 2210 prevents airflow (by convection) from passing between the upper and lower sides of thermal channel 220. Also, flexible coupler 2210 retains some mechanical contact with conductor 232 and shunts heat from conductor 232 to thermal channel 220. Any method for mechanically and thermally coupling flexible coupler 2210 and thermal channel 220 could be used. For example, a solder or weld joint, rivets, adhesive, or pinching of thermal coupler 2210 between two plates of a thermal channel may be used for this purpose.

Figure 3B:
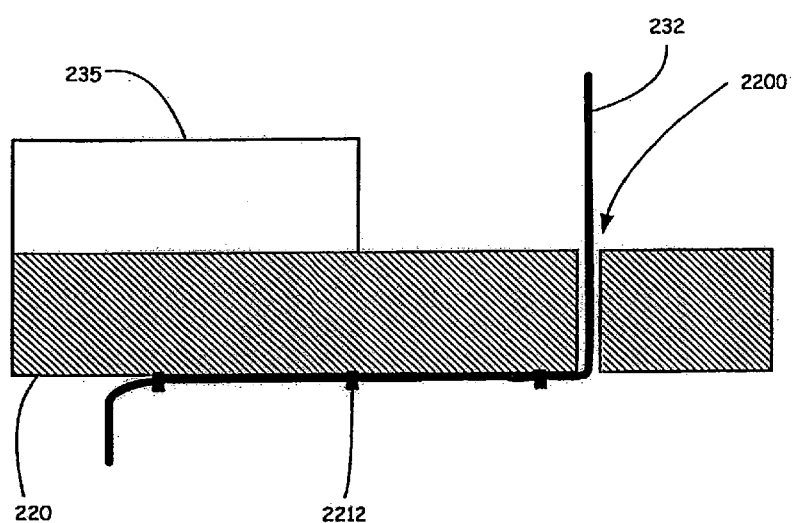
FIG. 3B illustrates a conductor running along the lower surface of a thermal channel as shown in FIG. 3.

As shown in FIG. 3B, conductor 232 can be disposed along the lower face of thermal channel 220 and run in sufficient length to allow the end of conductor 232 that is connected to sensor 225 to reach approximately the same temperature as hot lower portion 215 of housing 205. One or more attachment points 2212 may be installed to hold the conductor 232 against the lower face of the thermal channel 220.

Figure 4:
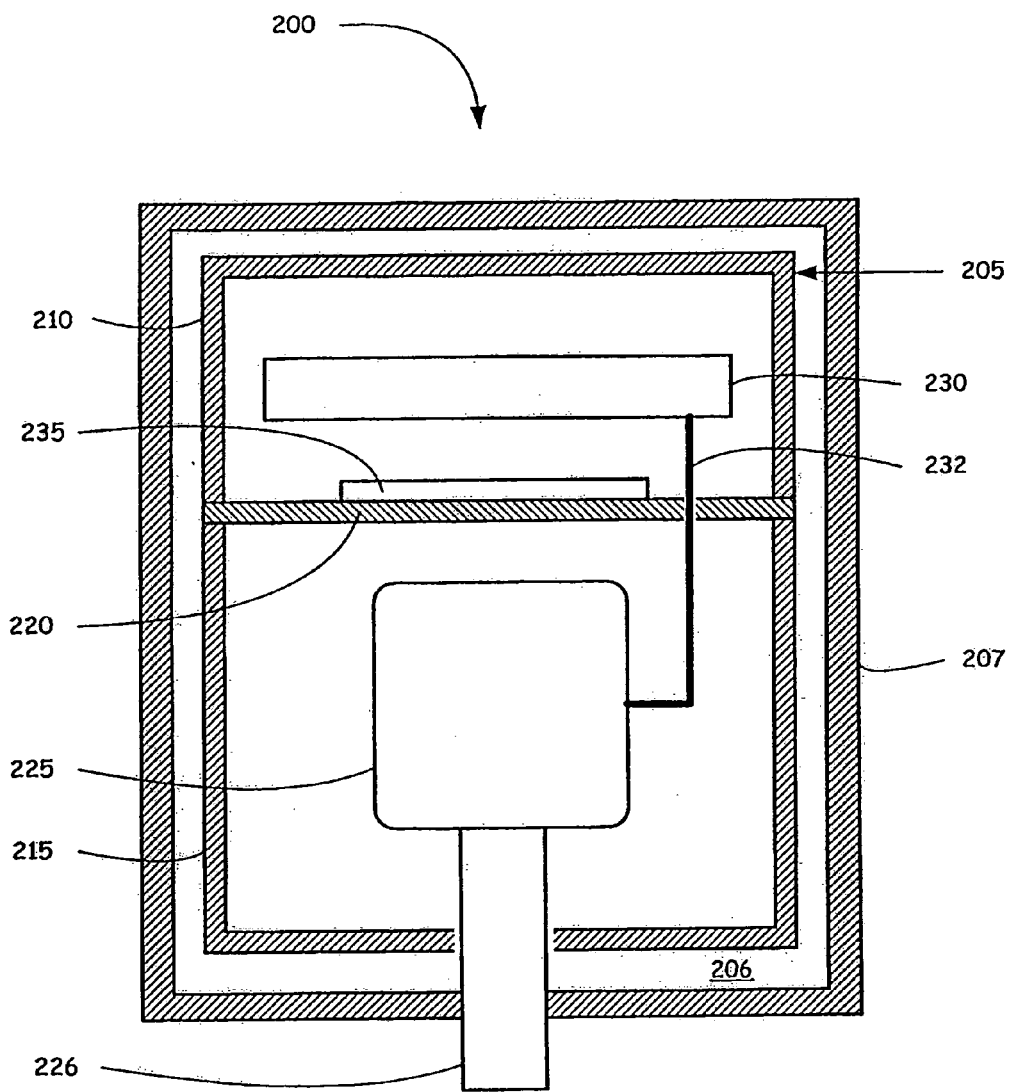
FIG. 4 illustrates an embodiment of a pressure-sensing device constructed according to the invention, showing an outer shell.

FIG. 4 illustrates an embodiment of a pressure sensing device 200 in which an external shell 207 surrounds housing 205. The external shell 207 may be separated from housing 205 by an air gap 206 or another insulating gap. In this embodiment, the exterior surface of external shell 207 is at a cooler temperature than the temperature of housing 205, and may be, for example, at a temperature which is kept below 60° C. to protect human operators from burn or injury upon touching the outer surface of external shell 207. External shell 207 may also provide added mechanical protection for the pressure sensing device 200 and its internal components.

Figure 5:
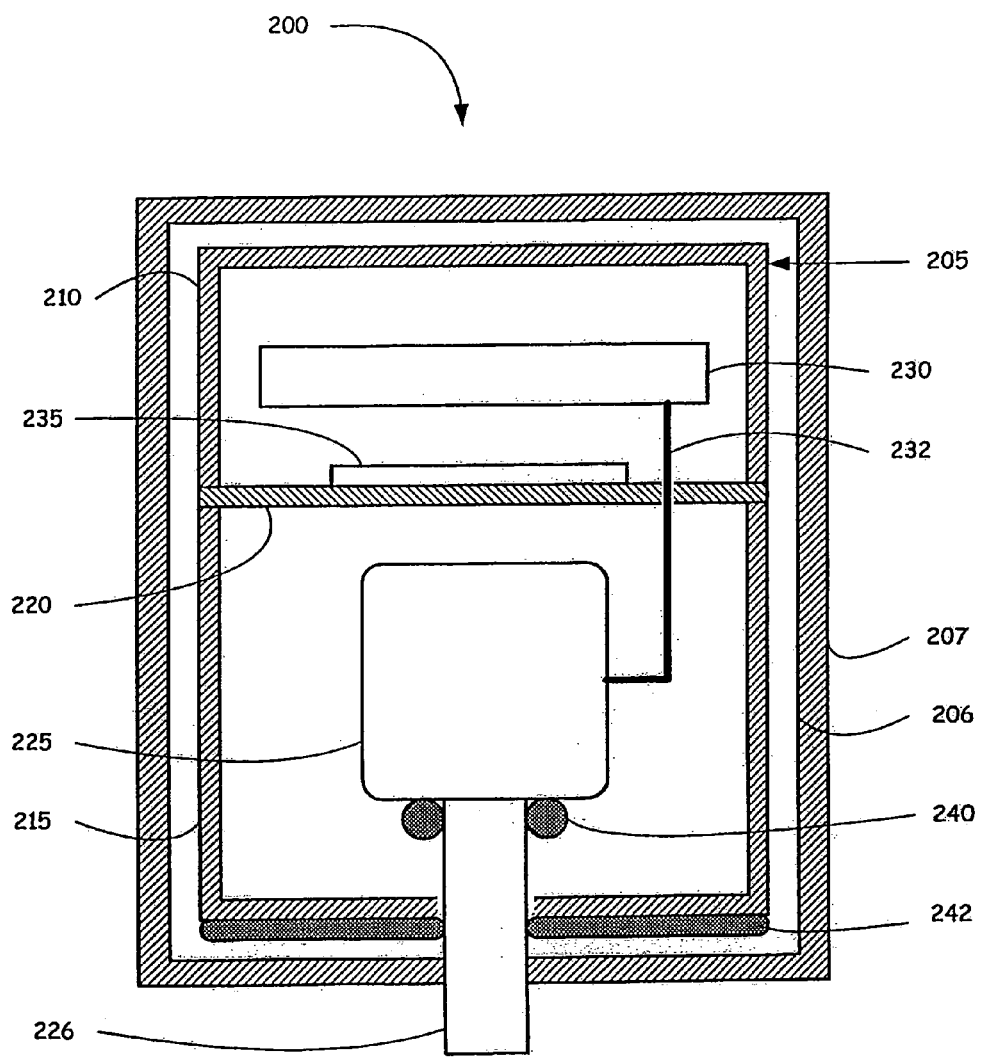
FIG. 5 illustrates an embodiment of a pressure-sensing device constructed according to the invention, showing electric heating elements.

FIG. 5 illustrates an embodiment of a pressure sensing device 200 having electrical heaters 240 and 242 disposed therein. The electrical heaters are sometimes referred to as cartridge heaters or barrel heaters, depending on their configuration. The heaters 240 and 242 are designed to heat the lower portion 215 of the housing 205 in general, and the pressure sensor 225 in particular to a desired temperature. This desired temperature is typically at or slightly above the temperature of the fluid system being measured. The temperature of the interior surfaces of the lower portion 215 of the housing are preferably maintained at a uniform temperature, e.g. 200° C., to avoid thermal gradients around pressure sensor 225.

In operation, heaters 240, 242 act to raise the temperature of pressure sensor 225 and lower portion 215 of housing 205 to a pre-selected temperature (e.g., 200° C.). Once the pre-selected temperature is achieved, the heaters operate in conjunction with SSHP 235 to keep the lower portion 215 at or around the pre-selected temperature. The heat transferred to thermal channel 220 by SSHP 235 advantageously allows the heaters 240, 242 to operate at lower levels than would otherwise be required if SSHP 235 were not present in the device. The cold upper portion 210 of housing 205 is also kept at or below a desired temperature (e.g., 70° C.).

In some embodiments, heaters 240, 242 are coupled to a heater control circuit (see, for example, U.S. Pat. No. 5,625,152), and the heater control circuit may be disposed in the first portion 210 as part of the sensor electronics 230.

Figure 6:
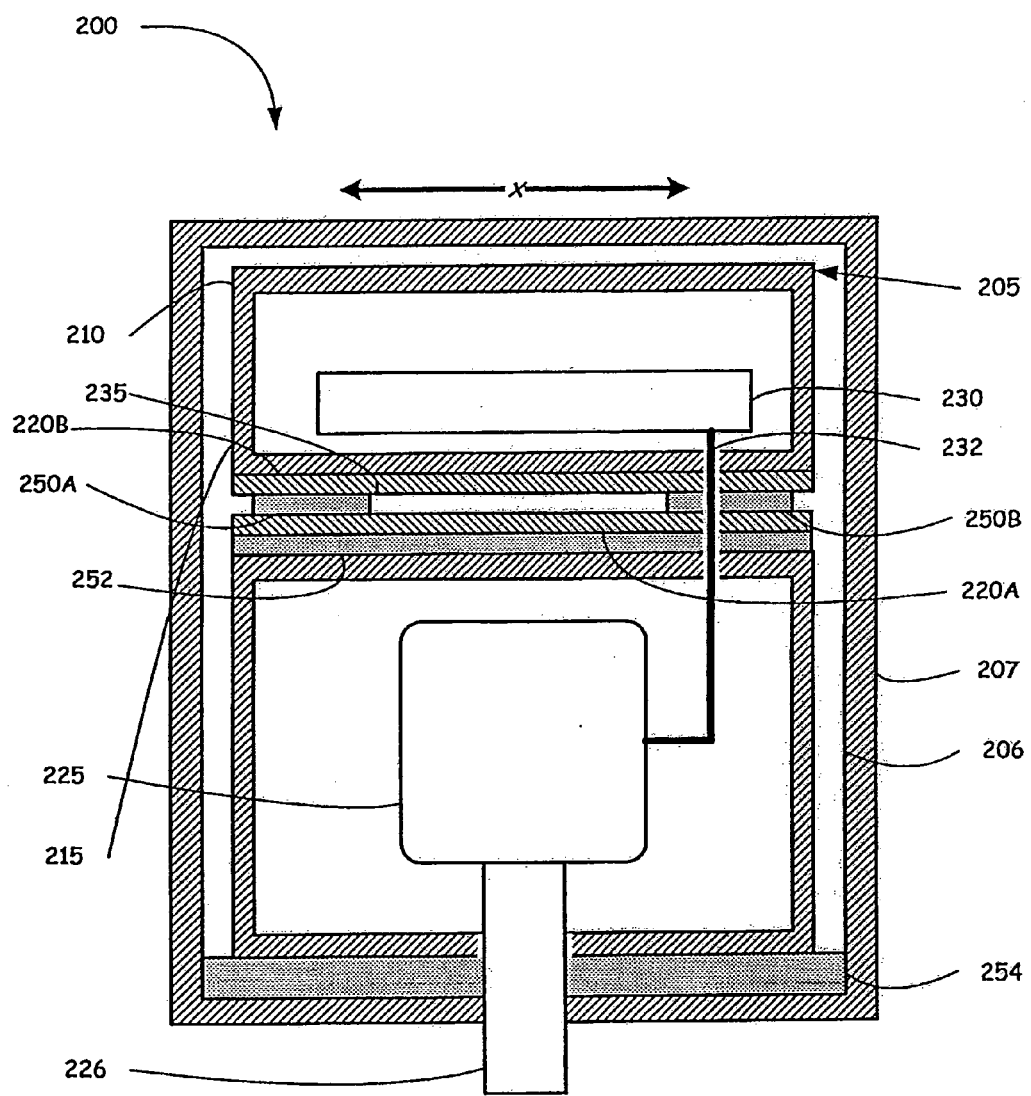
FIG. 6 illustrates an embodiment of a pressure-sensing device constructed according to the invention, showing a multi-layered thermal channel.

FIG. 6 illustrates an embodiment of a pressure sensing device 200 which employs insulators to further distribute the heat around pressure sensor 225. In this embodiment, a lower conducting plate 220A, which is preferably an aluminum plate, is disposed proximal to, or in contact with, the hot (lower) side 2360 of SSHP 235, and an upper conducting plate 220B, which is also preferably an aluminum plate, is disposed proximal to, or in contact with, the cold (upper) side 2350 of SSHP 235. Insulation material indicated by 250A and 250B surrounds the SSHP 235 on its sides between plates 220A and 220B. In addition, an insulating layer 252 is disposed adjacent lower conducting plate 220A between the lower conducting plate 220A and sensor 225. The conducting plates 220A, 220B conduct heat in a transverse direction, indicated by the arrow labeled "x" in FIG. 6. In this embodiment, thermal channel 220 includes upper plate 220A, lower plate 220B, insulation 250A and 250B, and insulating layer 252.

In operation, SSHP 235 applies heat to lower thermal channel plate 220A. Plate 220A advantageously conducts heat in the transverse direction "x" to the side walls of housing 205. If not for the heat conduction provided by lower thermal channel plate 220A, SSHP 235 would appear as a point source of heat to sensor 225, and sensor 225 would disadvantageously be exposed to a thermal gradient. Insulating layer 252 further reduces thermal gradients from the environment of sensor 225 by preventing heat from flowing directly from SSHP 235 to sensor 225 and instead directing this heat to housing 205, which uniformly distributes it around sensor 225.

Also shown in FIG. 6 is an insulating layer 254 disposed between housing 205 and external shell 207. Insulating layer 254 acts to shield external components below the pressure sensing device 200 from the high temperatures typically present near the lower portion of housing 205 where hot gases are present (an inlet manifold, which is not shown, is typically the hottest region of the pressure sensing device and is located near the bottom of housing 205).

Figure 7:
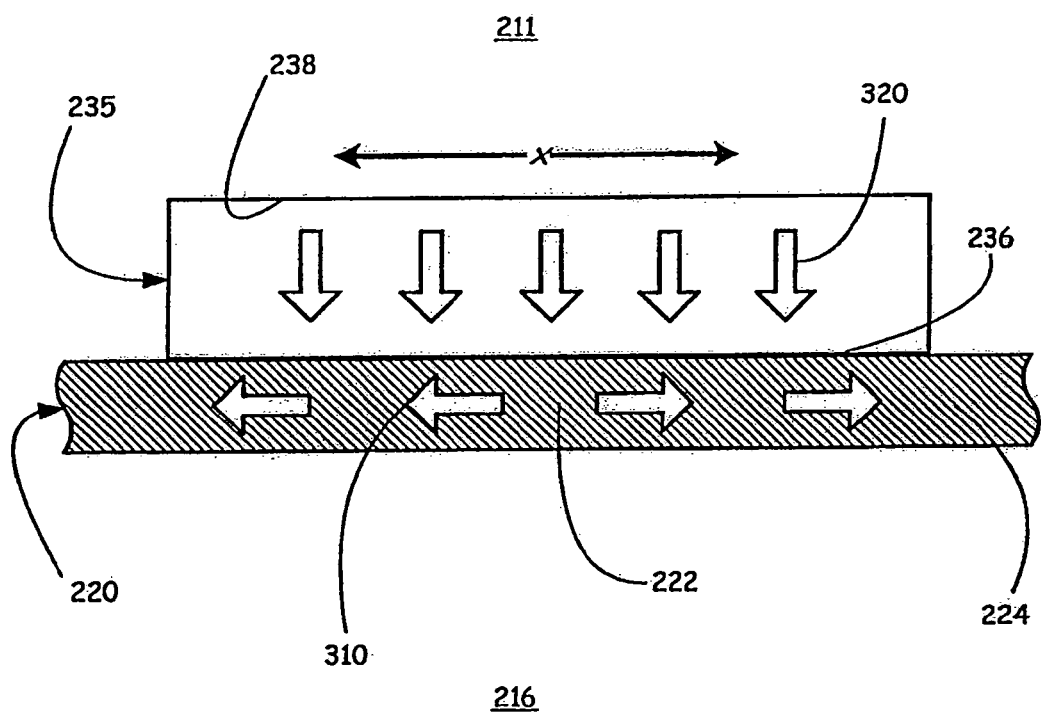
FIG. 7 illustrates a thermal channel and a SSHP moving heat within a device housing according to the invention.

FIG. 7 illustrates the heat flow within housing 205, and depicts the behavior of thermal channel 220 and SSHP 235. Heat flows by thermal conduction in a transverse direction through a conducting plate of thermal channel 220 (shown by horizontal arrows 310). The heat is carried from a central portion 222 to a peripheral portion 224 by the thermal channel 220. SSHP 235 pumps heat by a thermo-electric process from a cold face 238 of the SSHP 235 to a hot face 236 of the SSHP 235 (shown by vertical arrows 320). Therefore, first space 211 (above) and second space 216 (below) are kept at a temperature differential, with the second space 216 being hotter than the first space 211.

The thermal channel 220 may also include thermally-insulating layers, or combinations of insulating and conducting layers. In one example, the thermal channel includes a differential (or anisotropic) conductor having a plurality of conducting layers and insulating layers arranged adjacent to one another and forming a "sandwich" structure that inhibits or retards heat flow across the insulating layers (i.e. from SSHP 235 towards sensor 225), but enhances heat flow along the conducting layers (i.e. in the transverse direction "x"). Thus, placing the differential conductor between the first 211 and second 216 (cold and hot) spaces of the housing's interior will provide a thermal barrier between the first 211 and second 216 spaces in housing 205.

Figure 8:
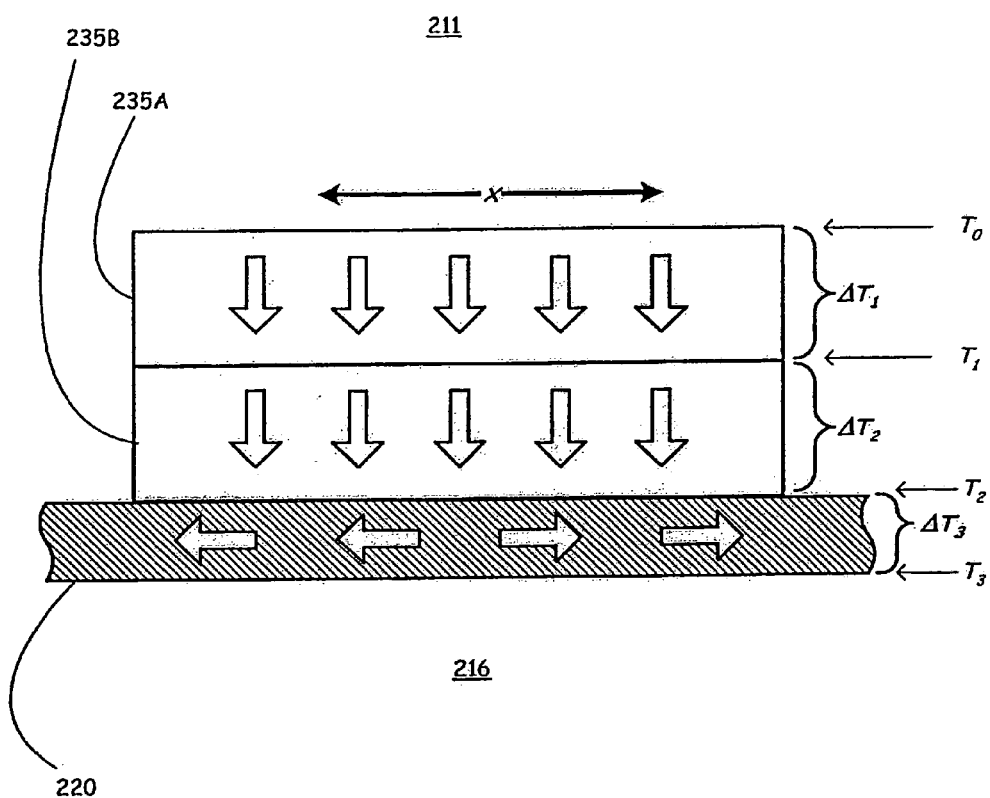
FIG. 8 illustrates a thermal channel coupled to a plurality of SSHPs that may be used to construct pressure-sensing devices according to the invention.

More than one SSHP or thermal channel may be employed in maintaining the desired temperature differential between the two portions of housing 205. FIG. 8 illustrates a device having one thermal channel and two SSHPs. A first SSHP 235A is disposed proximal to the first space 211 of housing 205, and provides a temperature differential $\Delta T_1 = T_1 - T_0$, where $T_1$ is the temperature of the hot face of SSHP 235A and $T_0$ is the temperature of the cold face of SSHP 235A. A second SSHP 235B is disposed directly below the first SSHP 235A and directly above thermal channel 220, and provides a temperature differential $\Delta T_2 = T_2 - T_1$, where $T_2$ is the temperature of the hot face of SSHP 235B and $T_1$ is the temperature of the cold face of SSHP 235B. This additive model may be a simplification, assuming that the hot face of SSHP 235A and the cold face of SSHP 235B are approximately at the same temperature ($T_1$), but it is being presented solely for the sake of illustration, and those skilled in the art will appreciate the dynamics of the heat transfer in its detail. The thermal channel 220 itself has a temperature differential $\Delta T_3 = T_3 - T_2$, across its thickness, where $T_3$ is the temperature of the lower face of the thermal channel 220 and $T_2$ is the temperature of the upper face of the thermal channel 220. Note that in the instant example, $T_2$ is the highest temperature among $T_0$, $T_1$, $T_2$ and $T_3$. The overall temperature differential between the upper space 211 of housing 205 and the lower space 216 of housing 205 is thus the sum of the temperature differentials of all the SSHPs 235A–B and the thermal channel 220. That is, the temperature different between spaces 211 and 216 is substantially equal to $(\Delta T_1 + \Delta T_2 + \Delta T_3)$. In this example $\Delta T_3$ is a negative value since $T_2$ is hotter than $T_3$.

In applications where the thermal channel 220 merely consists of a conducting plate, the temperature differential $\Delta T_3$ is relatively small compared to the overall temperature differential between spaces 211 and 216.

Figure 9:
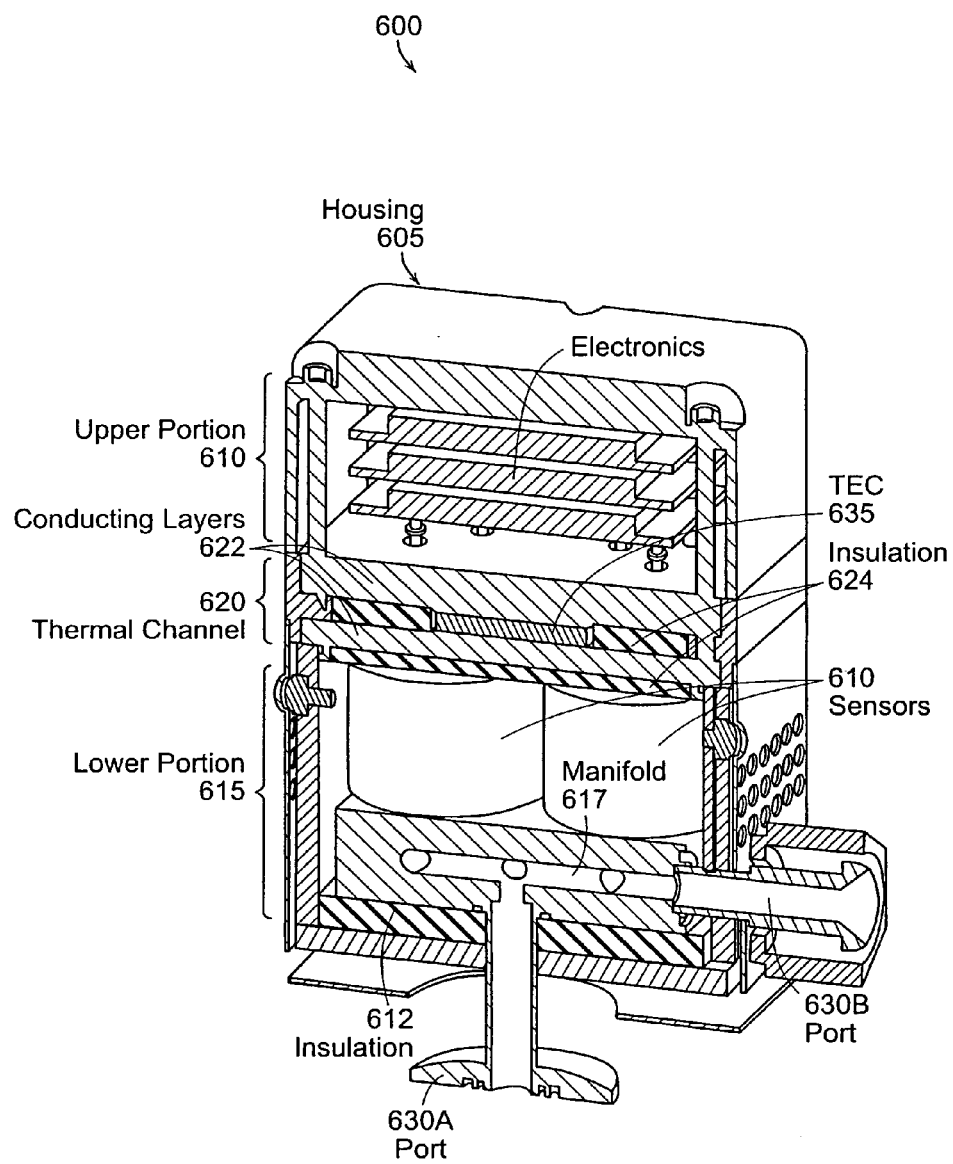
FIG. 9 illustrates an embodiment of a pressure-sensing device constructed according to the invention having more than one pressure sensor.

FIG. 9 illustrates an exemplary embodiment of a pressure-sensing device 600, in this instance having multiple pressure sensors 610 disposed in an insulated lower portion 615 of the device 600. For example, three sensors 610 are used, each sensor 610 operating in a different range of pressures. A manifold 617 provides sensors 610 with a source of fluid pressure from inlet port 630A. The device 600 in FIG. 9 shows a thermal channel 620, including substantially-parallel transverse conducting layers 622 and insulating layers 624 that move heat to the periphery of device 600, but block heat flow between the lower 615 and upper 610 portions of the device 600. The sensors 610 are insulated from below by insulating layer 612. Other electrical and mechanical penetrations and connections, such as port 630B, are made between the pressure-sensing device 600 and its environment, passing through housing 605 as required.

Figure 10:
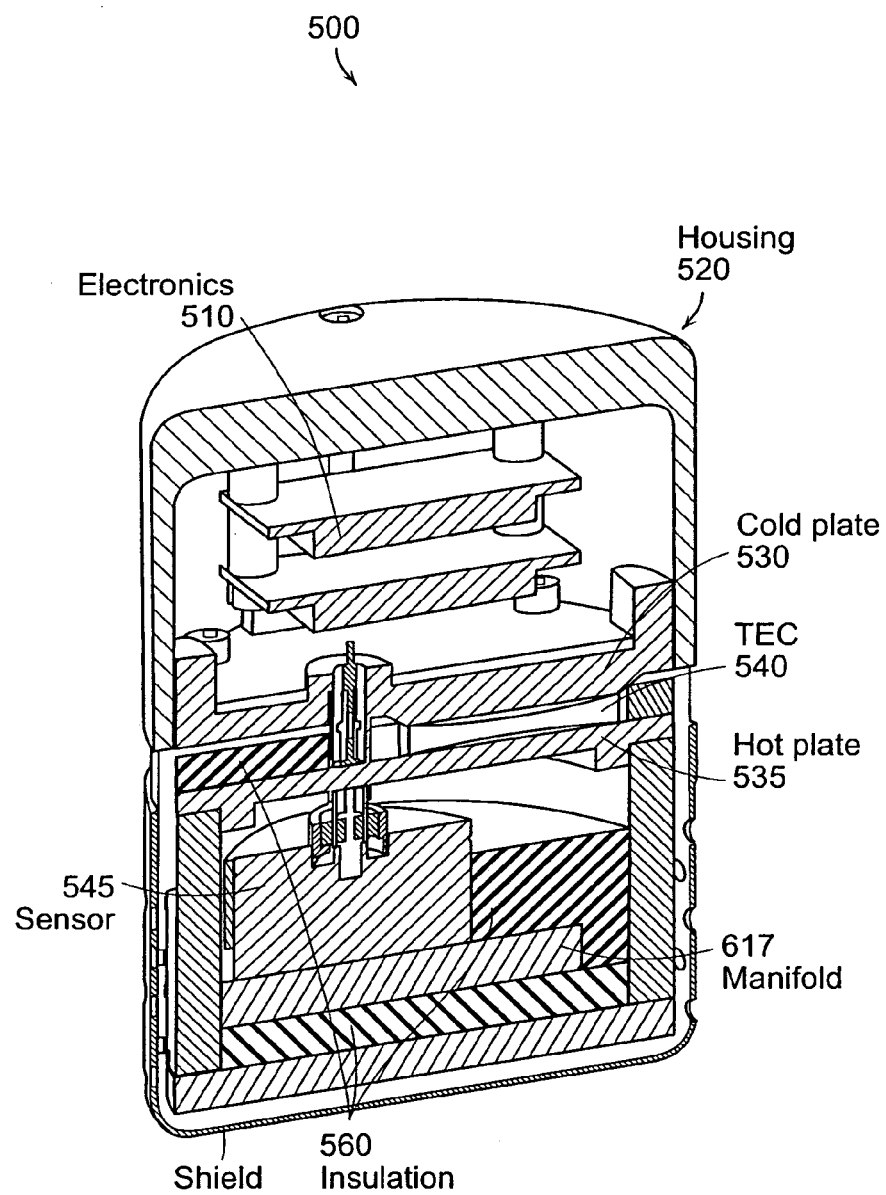
FIG. 10 illustrates an embodiment of a pressure-sensing device constructed according to the invention having a single pressure sensor.

FIG. 10 illustrates an exemplary pressure-sensing device 500 having a single sensor 545, and including electronics 510 disposed within a first (upper) portion of a housing 520. Pressure sensor 545 is disposed within a second (lower) portion of housing 520. A TEC 540 is disposed between an upper cold plate 530 and a lower hot plate 535. TEC 540 is surrounded on its sides by insulation 560. The pressure sensor 545 is surrounded by insulation 560 to keep the pressure sensor 545 at a high temperature.

The present embodiments are not limiting, and can be generalized according to the concepts presented herein to obtain other embodiments of pressure-sensing devices. For example, the SSHP is not limited to TECs, but may comprise any bimetallic junction or other active solid-state heat transfer device suitable for pumping heat from a cold side of the device to a hot side of the device.

The size and rating of the SSHP depends on the application and specifications for the system within which it is to be used, and its surface area may be small relative to the cross sectional area of the housing, or may substantially span the entire cross section of the housing.

Auxiliary electrical, fluid, and thermal components may be employed in the pressure-sensing devices. For example, in some embodiments, electrical heaters, such as strip heaters or barrel heaters, may be coupled to the walls of the housing or to the fluid intake tube or to the pressure sensor itself to maintain the proper temperature in the device.

Temperature control of the pressure-sensing device and/or the pressure sensor, electronics, or other components is achieved in some embodiments using an electronic control circuit to control the operation of the SSHP. This may be done in conjunction with controlling the electric heaters as mentioned above, or independent of the electric heater control. Additionally, thermal convection within the device can be used to properly distribute heat within the device and control the device's temperature.

Upon review of the present description and embodiments, it will be understood that modifications and equivalent substitutions may be performed in carrying out the invention without departing from the essence of the invention. Thus, the invention is not meant to be limited by the embodiments described explicitly above, rather it should be construed by the scope of the claims that follow.

What is claimed is:

1. A pressure transducer, comprising:
  a. a pressure sensor configured to operate above a first temperature;
  b. one or more electronic components electrically coupled to the pressure sensor, the one or more electronic components being configured to operate below a second temperature, the first temperature being greater than the second temperature; and
  c. a solid-state heat pump disposed between the pressure sensor and the one or more electronic components, the solid-state heat pump being configured to transfer heat from the one or more electronic components to the pressure sensor when the one or more electronic components are operating below the second temperature and the pressure sensor is operating above the first temperature.

2. A pressure transducer according to claim 1, the solid-state heat pump comprising a thermo electric cooler.

3. A pressure transducer according to claim 1, the pressure sensor being a capacitive pressure sensor.

4. A pressure transducer according to claim 3, the one or more electronic components generating an output signal, the output signal being generated according to a function of a capacitance of the pressure sensor.

5. A pressure transducer according to claim 1, the transducer including a housing, the pressure sensor being disposed in a first portion of the housing, the one or more electronic components being disposed in a second portion of the housing, the solid-state heat pump being disposed between the first and second portions of the housing.

6. A pressure transducer according to claim 5, the solid-state heat pump being configured to transfer heat from the second portion of the housing to the first portion of the housing when the first portion of the housing is above the first temperature and the second portion of the housing is below the second temperature.

7. A pressure transducer according to claim 6, the transducer including one or more heaters disposed proximal to the first portion of the housing.

8. A pressure transducer according to claim 7, the heaters configured to heat the first portion of the housing to at least the first temperature.

9. A pressure-sensing device, comprising:
   a. a housing;
   b. sensor electronics disposed within a first portion of the housing;
   c. a pressure sensor disposed within a second portion of the housing; and
   d. a solid-state heat pump disposed between the first and second portions of the housing, the solid state heat pump configured to transfer heat from a first face of the solid state heat pump, proximal to the first portion of the housing, to a second face of the solid state heat pump, proximal to the second portion of the housing.

10. The device of claim 9, wherein the solid state heat pump comprises a thermo-electric cooler.

11. The device of claim 9, wherein the first face of the solid state heat pump is colder than the second face of the solid state heat pump.

12. The device of claim 9, further comprising a thermal channel that conducts heat from a central portion of the device to a peripheral portion of the device.

13. The device of claim 12, wherein the thermal channel comprises a thermally-conducting plate disposed between the first and second portions of the housing.

14. The device of claim 12, wherein the thermal channel is thermally coupled to the housing.

15. The device of claim 9, wherein the second portion of the housing is adapted to operate at a higher temperature than the first portion.

16. The device of claim 9, wherein the pressure sensor comprises a capacitive pressure sensor.

17. The device of claim 9, further comprising an electric heater disposed in the second portion of the housing.

18. The device of claim 9, further comprising an external shell surrounding the housing.

19. A pressure-sensing device, comprising:
   a. a housing;
   b. a thermal channel substantially dividing the housing into a first portion and a second portion;
   c. sensor electronics disposed within the first portion of the housing;
   d. a capacitive pressure sensor disposed within the second portion of the housing; and
   e. a thermo-electric cooler configured to transfer heat from a first face of the thermo-electric cooler, proximal to the first portion of the housing, to a second face of the thermo-electric cooler, proximal to the second portion of the housing.

20. The device of claim 19, further comprising an external shell surrounding at least a portion of the housing.

21. The device of claim 19 further comprising an electric heater that adds heat to the second portion of the housing.

22. The device of claim 19, further comprising a solid state heat pump, wherein the thermo-electric cooler is thermally coupled to the solid state heat pump and arranged such that both the thermo-electric cooler and the solid state heat pump move heat away from the first portion of the housing and towards the second portion of the housing.

23. The device of claim 22, wherein the solid-state heat pump comprises a second thermo-electric cooler.

24. The device of claim 19, wherein the thermal channel comprises a conductor that conducts heat from a central portion of the device to a peripheral portion of the device.

25. The device of claim 19, further comprising a second pressure sensor disposed within the second portion of the housing.

26. A pressure transducer, comprising:
   a capacitive pressure sensor, the sensor defining an interior chamber and a flexible diaphragm, the diaphragm dividing the interior chamber into a first portion and a second portion, the second portion being evacuated to a vacuum reference pressure, the diaphragm flexing in a first direction when a pressure in the first portion is greater than the vacuum reference pressure, the diaphragm flexing in a second direction when the pressure in the first portion is less than the vacuum reference pressure, the sensor further including a conductive element disposed in the second portion, at least a portion of the diaphragm being conductive, a capacitance of the conductive element and the conductive portion of the diaphragm being representative of a pressure in the first portion;
   a thermally conductive heater shell, the capacitive pressure sensor being disposed within the heater shell;
   an external enclosure, the heater shell being disposed within the external enclosure;
   one or more electronic components electrically coupled to the pressure sensor, the one or more electronic components generating an output signal representative of the pressure within the first portion of the interior chamber, the one or more electronic components being disposed within the external enclosure and outside the heater shell; and
   a solid state heat pump disposed between the one or more electronic components and the pressure sensor, the heat pump being configured to transfer heat from the one or more electronic components to the pressure sensor.

27. The transducer of claim 26, wherein the solid state heat pump comprises a thermo-electric cooler.

28. The transducer of claim 26, wherein one or more electronic components operate at a lower temperature than does the capacitive pressure sensor.

29. The transducer of claim 26, further including one or more electric heaters that heat the heater shell.

* * * * *